(12) United States Patent
Ikeda

(10) Patent No.: US 12,420,756 B2
(45) Date of Patent: Sep. 23, 2025

(54) BRAKE CONTROL APPARATUS

(71) Applicant: ISUZU MOTORS LIMITED, Yokohama (JP)

(72) Inventor: Shingo Ikeda, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 60 days.

(21) Appl. No.: 18/530,427

(22) Filed: Dec. 6, 2023

(65) Prior Publication Data
US 2024/0239316 A1    Jul. 18, 2024

(30) Foreign Application Priority Data

Jan. 12, 2023   (JP) .................................. 2023-003076

(51) Int. Cl.
| | | |
|---|---|---|
| B60T 8/1755 | (2006.01) | |
| B60T 8/17 | (2006.01) | |
| B60T 8/171 | (2006.01) | |
| B60T 8/58 | (2006.01) | |

(52) U.S. Cl.
CPC ........ B60T 8/17555 (2013.01); B60T 8/1701 (2013.01); B60T 8/171 (2013.01); B60T 8/58 (2013.01); *B60T 2210/32* (2013.01); *B60T 2210/36* (2013.01); *B60T 2250/00* (2013.01); *B60T 2250/04* (2013.01)

(58) Field of Classification Search
CPC .... B60T 8/17555; B60T 8/1701; B60T 8/171; B60T 8/58; B60T 2210/32; B60T 2210/36; B60T 2250/00; B60T 2250/04
See application file for complete search history.

(56) References Cited

U.S. PATENT DOCUMENTS

| | | | |
|---|---|---|---|
| 2023/0211759 A1* | 7/2023 | Kim .......................... | B60T 7/12 701/70 |
| 2024/0208513 A1* | 6/2024 | Kim ....................... | B60W 40/13 |

FOREIGN PATENT DOCUMENTS

JP          2014-201252 A      10/2014

* cited by examiner

*Primary Examiner* — Jacob M Amick
(74) *Attorney, Agent, or Firm* — PROCOPIO, CORY, HARGREAVES & SAVITCH LLP

(57) ABSTRACT

A brake control apparatus includes a deceleration control part that decelerates a vehicle either in a first brake control mode using a main brake and an auxiliary brake that uses discrete deceleration values, or in a second brake control mode using the main brake without the auxiliary brake, a determination part that determines whether or not occupants in the vehicle are seated in seats of the vehicle, and a selection part that selects the first brake control mode if the determination part determines that the occupants are seated in the seats, and selects the second brake control mode if the determination part determines that the occupant is not seated in the seat.

7 Claims, 4 Drawing Sheets

BRAKE CONTROL APPARATUS

CROSS-REFERENCE TO RELATED APPLICATIONS

The present application claims priority to Japanese Patent Application number 2023-003076, filed on Jan. 12, 2023, contents of which are incorporated herein by reference in its entirety.

BACKGROUND OF THE INVENTION

The present disclosure relates to a brake control apparatus.

A conventional brake blending control apparatus controls braking of a vehicle by combining i) a main brake that reduces a speed of a vehicle in response to an operation of a brake pedal by a driver and ii) an auxiliary brake that reduces the speed of the vehicle by using an exhaust brake or a retarder (for example, Japanese Unexamined Patent Application Publication No. 2004-201252).

Since an auxiliary brake uses discrete deceleration values, such as "strong" and "weak," a vehicle speed may not be reduced smoothly when the auxiliary brake is used. For this reason, if an auxiliary brake is used to decelerate a vehicle when an occupant is not seated in a seat of the vehicle, the occupant may lose his/her posture and the safety of the occupant may be compromised.

BRIEF SUMMARY OF THE INVENTION

The present disclosure focuses on this point, and an object thereof is to perform brake control suitable for an occupant in a vehicle.

MEANS FOR SOLVING THE PROBLEMS

A brake control apparatus of an aspect of the present disclosure includes a deceleration control part that decelerates a vehicle either in a first brake control mode using a main brake and an auxiliary brake that uses discrete deceleration values, or in a second brake control mode using the main brake without the auxiliary brake, a determination part that determines whether or not occupants in the vehicle are seated in seats of the vehicle, and a selection part that selects the first brake control mode if the determination part determines that the occupants are seated in the seats, and selects the second brake control mode if the determination part determines that the occupant is not seated in the seat.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

<Overview of Vehicle S>

Figure 1:
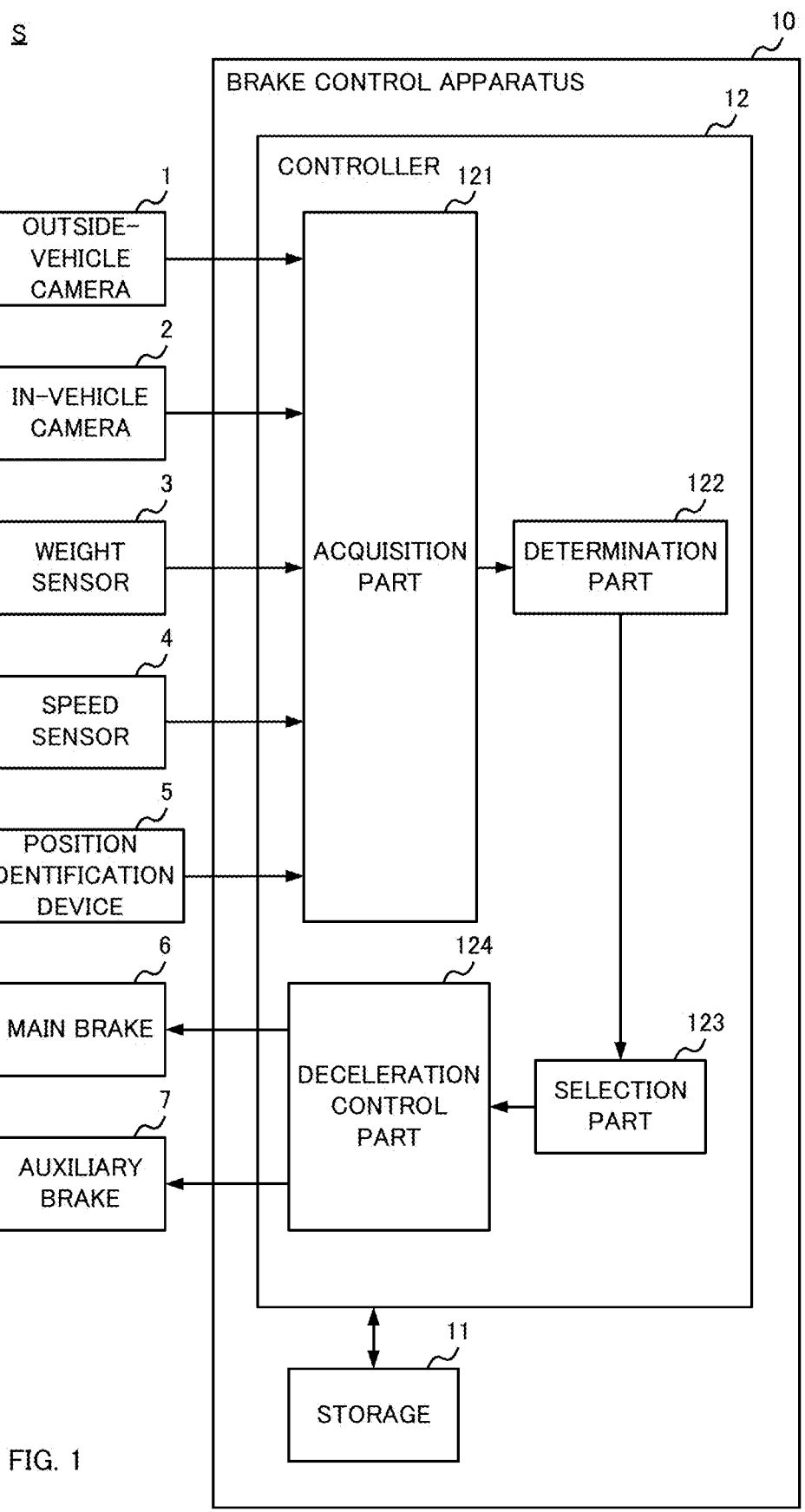
FIG. 1 illustrates an overview of a vehicle S according to the present embodiment.

FIG. 1 illustrates an overview of a vehicle S according to the present embodiment. The vehicle S shown in FIG. 1 includes an outside-vehicle camera 1, an in-vehicle camera 2, a weight sensor 3, a speed sensor 4, a position identification device 5, a main brake 6, an auxiliary brake 7, and a brake control apparatus 10. The vehicle S is, for example, a route bus that travels with automatic steering, and has an ability to decelerate during travel.

The outside-vehicle camera 1 transmits an outside-vehicle image, generated by capturing an image in front of the vehicle S in a traveling direction, to the brake control apparatus 10. The in-vehicle camera 2 transmits an in-vehicle image, generated by capturing an image of the inside of the vehicle S, to the brake control apparatus 10.

The weight sensor 3 detects and transmits to the brake control apparatus 10 a weight loaded on an area of a floor surface inside of the vehicle S where a seat is not provided (that is, a weight of a person not seated in a seat and an object placed on the floor). The speed sensor 4 detects and transmits to the brake control apparatus 10 a speed of the vehicle S.

The position identification device 5 performs a process of identifying a position of the vehicle S. For example, the position identification device 5 identifies the position of the vehicle S on the basis of radio waves received from an external positioning system (not shown in figures) such as Global Navigation Satellite System (GNSS). As another example, the position identification device 5 identifies the position of the vehicle S on the basis of point cloud data generated by measuring objects around the vehicle S by using a three-dimensional laser (not shown in figures) such as Light Detection And Ranging (LiDAR). The position identification device 5 may have a housing containing electronic components, or may be a printed circuit board on which electronic components are mounted.

The main brake 6 is at least any of a disc brake or a drum brake. The disc brake is a brake that decelerates the vehicle S using a frictional force generated by pressing a brake pad against a brake rotor. The drum brake is a brake that decelerates the vehicle S using a frictional force generated by pressing a brake lining against the inside of a brake drum, which rotates together with wheels.

The auxiliary brake 7 includes at least i) a retarder, which decelerates the vehicle S by applying a load to a rotation of a propulsion shaft of the vehicle S, or ii) an exhaust brake, which decelerates the vehicle S by increasing an effect of an engine brake by utilizing a rotational resistance of an engine of the vehicle S. The auxiliary brake 7 can use discrete deceleration values, such as "strong" and "weak." As an example, the vehicle S is decelerated by using both the exhaust brake and the retarder if the deceleration of the auxiliary brake 7 is "strong," and is decelerated by using either the exhaust brake or the retarder if the deceleration of the auxiliary brake 7 is "weak."

The brake control apparatus 10 performs a process to decelerate the vehicle S traveling with the automatic steering, by using one or more brakes selected from the main brake 6 and the auxiliary brake 7. The brake control apparatus 10 may have a housing containing electronic components, or may be a printed circuit board on which electronic components are mounted.

The vehicle S is decelerated by using the auxiliary brake 7, which enables suppression of wear and tear on consumables such as brake pads and brake shoes provided to the main brake 6. However, since the auxiliary brake 7 uses the discrete deceleration values, the vehicle S may not be able to smoothly reduce the speed of the vehicle S with the auxiliary brake 7. As a result, the occupant of the vehicle S may lose his/her posture, which may compromise his/her safety.

Accordingly, the brake control apparatus 10 determines whether the occupant is seated or not on the basis of the posture of the occupant extracted from the in-vehicle image generated by the in-vehicle camera 2 or the weight detected by the weight sensor 3, and selects a brake to be used for decelerating the vehicle S according to a determined result. Specifically, the brake control apparatus 10 selects the main brake 6 and the auxiliary brake 7 if the occupant is seated, and selects the main brake 6 if the occupant is not seated. This makes it easier to ensure the safety of the occupant, as the vehicle S can be decelerated without using the auxiliary brake 7 if the occupant is prone to losing his/her posture.

Hereinafter, a configuration and operation of the brake control apparatus 10 will be described in detail.

<Configuration of Brake Control Apparatus 10>

The brake control apparatus 10 includes a storage 11 and a controller 12. The controller 12 includes an acquisition part 121, a determination part 122, a selection part 123, and a deceleration control part 124.

The storage 11 includes a storage medium such as a Read Only Memory (ROM), a Random Access Memory (RAM), a Hard Disk Drive (HDD), or a Solid State Drive (SSD). The storage 11 stores a program executed by the controller 12. The storage 11 stores various kinds of information for decelerating the vehicle S traveling with the automatic steering. For example, the storage 11 stores map information including a route for the vehicle S to travel.

The controller 12 is, for example, a processor such as a Central Processing Unit (CPU) or an Electronic Control Unit (ECU). The controller 12 functions as the acquisition part 121, the determination part 122, the selection part 123, and the deceleration control part 124 by executing the program stored in the storage 11. It should be noted that the controller 12 may be formed by a single processor, or may be formed by a plurality of processors or a combination of one or more processors and an electronic circuit.

The configuration of each unit implemented by the controller 12 will be described below.

The acquisition part 121 acquires the outside-vehicle image acquired by the outside-vehicle camera 1 capturing an image in front of the vehicle S in the traveling direction. The acquisition part 121 stores the outside-vehicle image acquired from the outside-vehicle camera 1 in the storage 11.

Figure 2:
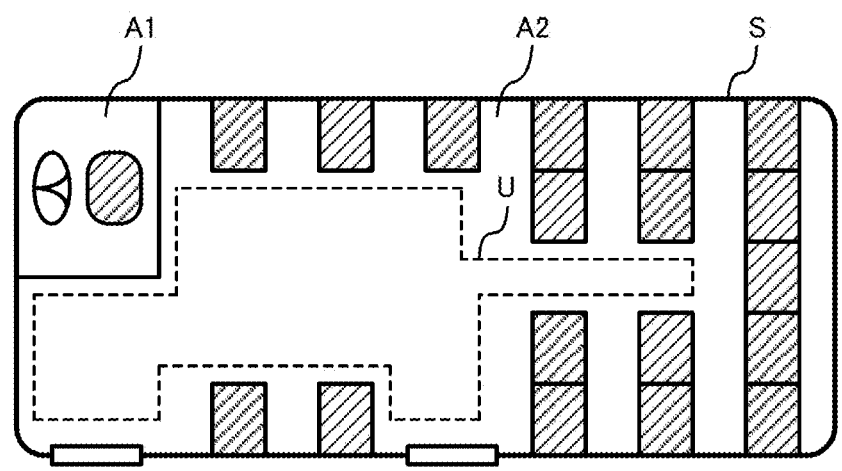
FIG. 2 shows an area to be captured by an in-vehicle camera 2.

The acquisition part 121 acquires an in-vehicle image acquired by the in-vehicle camera 2 capturing an image of the inside of the vehicle S. The in-vehicle image is an image generated by capturing the area inside of the vehicle S where the seat is not provided (that is, an area where there may be an occupant not seated in the seat of the vehicle S or an object placed on the floor surface). FIG. 2 shows an area to be captured by the in-vehicle camera 2. FIG. 2 shows a view of the vehicle S from above, showing an area A1 occupied by a driver of the vehicle S, an area A2 occupied by the occupant in the vehicle S, and an area U to be captured by the in-car camera 2. In FIG. 2, the seats of the vehicle S are shown in shaded lines. The acquisition part 121 acquires and stores in the storage 11 the in-vehicle image generated by the in-vehicle camera 2 capturing the image of the occupant or object in the area U. It should be noted that the acquisition part 121 may acquire the in-vehicle image generated by the in-vehicle camera 2 capturing the image of the area U and the seats included in the area A2.

The acquisition part 121 acquires, from the weight sensor 3, the weight loaded on the area U of the floor surface inside of the vehicle S where seats are not provided. The acquisition part 121 acquires the speed of the vehicle S from the speed sensor 4. The acquisition part 121 acquires position information indicating the position of the vehicle S from the position identification device 5. The position information is, for example, information indicating the position of the vehicle S in coordinates corresponding to the world coordinate system.

The determination part 122 determines whether an occupant in the vehicle S is seated in a seat of the vehicle S or not. The determination part 122 determines, for example, that "an occupant is not seated" if at least one of the plurality of occupants on the vehicle S is not seated in the seat, and that "the occupants are seated" if all of the plurality of occupants are seated in the seats. The determination part 122 determines, for example, that "an occupant is not seated" if at least one occupant is extracted from the area U included in the in-vehicle image acquired by the acquisition part 121, and that "the occupants are seated" if no occupant is extracted from the area U included in said in-vehicle image.

By having the determination part operated in this manner, it is possible to determine whether or not an occupant is seated in a seat when the occupant included in the in-vehicle image is extracted, without performing a process to identify whether or not the occupant is seated in the seat on the basis of the occupant's position or the occupant's posture. Further, even if a plurality of occupants are included in the in-vehicle image, it is possible to determine whether or not the occupants are seated in the seats by extracting one occupant. As a result, the determination part 122 can reduce the amount of calculation required to determine whether or not the occupants are seated in the seats.

The determination part 122 may determine whether or not the occupants are seated in the seats on the basis of the weight detected by the weight sensor 3. The determination part 122 determines whether or not the occupants are seated in the seats by determining, for example, whether or not the weight loaded on the area U shown in FIG. 2, acquired by the acquisition part 121 from the weight sensor 3, is a weight of at least one person. The weight of at least one person is, for example, the average weight of a person of the youngest age among the ages that can stand using a support tool in the area U, and is stored in the storage 11. The support tool is a hanging strap or a support such as a handrail, for example.

The determination part 122 may determine whether or not the occupants are seated in the seats on the basis of the posture of an occupant extracted from the in-vehicle image. The determination part 122, for example, extracts an image showing a person (that is, an occupant) included in the in-vehicle image acquired by the acquisition part 121, and determines whether or not the posture of the occupant shown by the extracted image is a posture of a person seated in a seat of the vehicle S. It should be noted that an unseated posture includes standing as well as a position on a moving device such as a wheelchair and a stroller, and a posture with an assistive device such as a cane.

Further, the determination part 122 may determine whether or not a hand of an occupant who is not seated in a seat, extracted from the in-vehicle image, is in contact with a support tool of the vehicle S. By being operated in this manner, the determination part 122 can determine whether an occupant who is not seated in a seat is gripping the support tool, and thus whether or not said occupant is prone to losing his/her posture due to the deceleration of the vehicle S.

The selection part 123 selects a first brake control mode if the determination part 122 determines that the occupants are seated in the seats, and selects a second brake control mode if the determination part 122 determines that an occupant is not seated in a seat. The first brake control mode is a method of decelerating the vehicle S by using the main brake 6 and the auxiliary brake 7, which uses discrete deceleration values, and the second brake control mode is a method of decelerating the vehicle S by using the main brake 6 without the auxiliary brake 7.

By having the selection part 123 operated in this manner, the brake control apparatus 10 can decelerate the vehicle S without using the auxiliary brake 7 if an occupant is not seated in a seat, and so the vehicle S can be decelerated so as not to compromise the safety of the occupant. As a result, the brake control suitable for the occupant in the vehicle S can be performed.

The selection part 123 may select the first brake control mode if the determination part 122 determines that the hand of the occupant who is not seated in a seat is in contact with the support tool, and may select the second brake control mode if the determination part 122 determines that the hand of the occupant is not in contact with the support tool. By having the selection part 123 operated in this manner, the brake control apparatus 10 can use the auxiliary brake 7 to decelerate the vehicle S if an occupant who is not seated in a seat is gripping the support tool such as a hanging strap to support oneself. As a result, the auxiliary brake 7 can be used more frequently, thus reducing the wear and tear of the main brake 6.

Incidentally, when the route bus travels with the automatic steering, it is conceivable that the vehicle travels along a set route. The set route includes a position where it is predetermined that the vehicle will stop, such as a station or a stop line (hereinafter referred to as a "stop position"). Therefore, the selection part 123 selects the second brake control mode if the determination part 122 determines that the occupants are seated and if the vehicle S arrived at a position that is a predetermined distance prior to the stop position in the route included in the map information for. The predetermined distance is longer than the braking distance required for the vehicle S to stop, and is stored in the storage 11. The predetermined distance may be defined according to the speed of the vehicle S.

Figure 3:
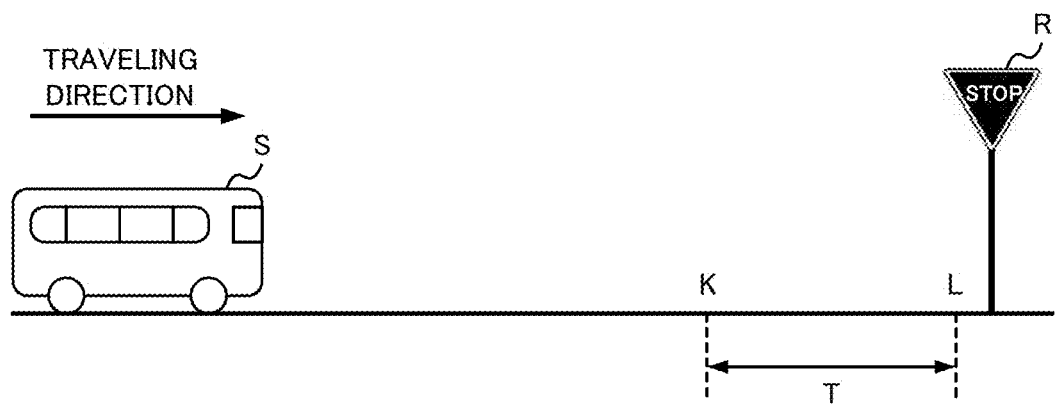
FIG. 3 illustrates an operation of the vehicle S stopping at a stop position.

FIG. 3 illustrates an operation of the vehicle S stopping at the stop position. In FIG. 3, the vehicle S stops at a position L on the stop line corresponding to a sign R indicating that vehicles must stop. A distance T shown in FIG. 3 is the predetermined distance stored in the storage 11. In FIG. 3, the selection part 123 determines whether or not a head position of the vehicle S, acquired by the acquisition part 121 at every predetermined time, arrived at a position K, which is a position prior to the position L indicated by the map information for the distance T. If the head position of the vehicle S arrived at the position K, the selection part 123 selects the second brake control mode.

Since the selection part 123 operates in this manner, the selection part 123 can select the second brake control mode at a position where it is predetermined for the vehicle to stop, even if the determination part 122 determines that the occupants are seated. As a result, the brake control apparatus 10 can smoothly decelerate the vehicle S by using the second brake control mode (that is, the main brake 6) when the vehicle S stops at the stop position, even if the occupants are seated, thereby improving passenger comfort.

Further, the selection part 123 may also select the second brake control mode if the selection part 123 detects that there is a person crossing a crosswalk included in the outside-vehicle image and if a distance between a position of the crosswalk indicated by the map information and the position of the vehicle S traveling prior to the crosswalk has become the predetermined distance. The selection part 123 detects, for example, the person who is crossing the crosswalk in front of the vehicle S in the traveling direction or a person who is stopped to cross the crosswalk from the outside-vehicle image acquired by the acquisition part 121. The selection part 123 then selects the second brake control mode when the distance between the position of the crosswalk indicated by the map information and the position of the vehicle S acquired by the acquisition part 121 has become the predetermined distance. By having the selection part 123 operated in this manner, the brake control apparatus 10 can smoothly decelerate the vehicle S even in a case where the vehicle S stops at a position different from the stop position.

If the traveling vehicle S detects a pedestrian crossing a road, a damaged road, or an obstacle placed on the road just before coming into contact with it, the vehicle S decelerates the vehicle S at a greater deceleration rate (so-called hard braking) than when stopping at the stop position. In this case, using the auxiliary brake 7 may cause the rear wheels of the vehicle S to slip and prevent the vehicle S from stopping safely. Thus, the selection part 123 identifies the deceleration of the vehicle S on the basis of i) a distance between the position of the vehicle S and the position at which the vehicle S stops and ii) the speed of the vehicle S, and selects the second brake control mode if the deceleration is equal to or greater than a threshold value, and selects the first brake control mode if the deceleration is less than the threshold value. The threshold value is a value determined according to a coefficient of friction of the road surface on which the vehicle S travels, and is stored in the storage 11. The selection part 123 identifies the threshold value corresponding to the coefficient of friction acquired from an external device (not shown in figures) by referring to the storage 11, for example.

On the basis of, for example, i) a distance between the position of the pedestrian, the damaged place, or the obstacle included in the outside-vehicle image and the position of the vehicle S and ii) the vehicle speed of the vehicle S acquired by the acquisition part 121, the selection part 123 identifies the deceleration for stopping the vehicle S within a distance shorter than said distance. The selection part 123 selects the second brake control mode if the identified deceleration is equal to or greater than the threshold value stored in the storage 11, and selects the first brake control mode if the identified deceleration is less than the threshold value. This makes it possible to perform the braking control suitable for the deceleration of the vehicle S when it comes to a stop.

The deceleration control part 124 decelerates the vehicle S either in the first brake control mode or in the second brake control mode. For example, the deceleration control part 124 decelerates the vehicle S by using the main brake 6 and the auxiliary brake 7 if the selection part 123 selects the first brake control mode. The deceleration control part 124 decelerates the vehicle S by using the main brake 6 if the selection part 123 selects the second brake control mode.

<Process Sequence in Brake Control Apparatus 10>

Figure 4:
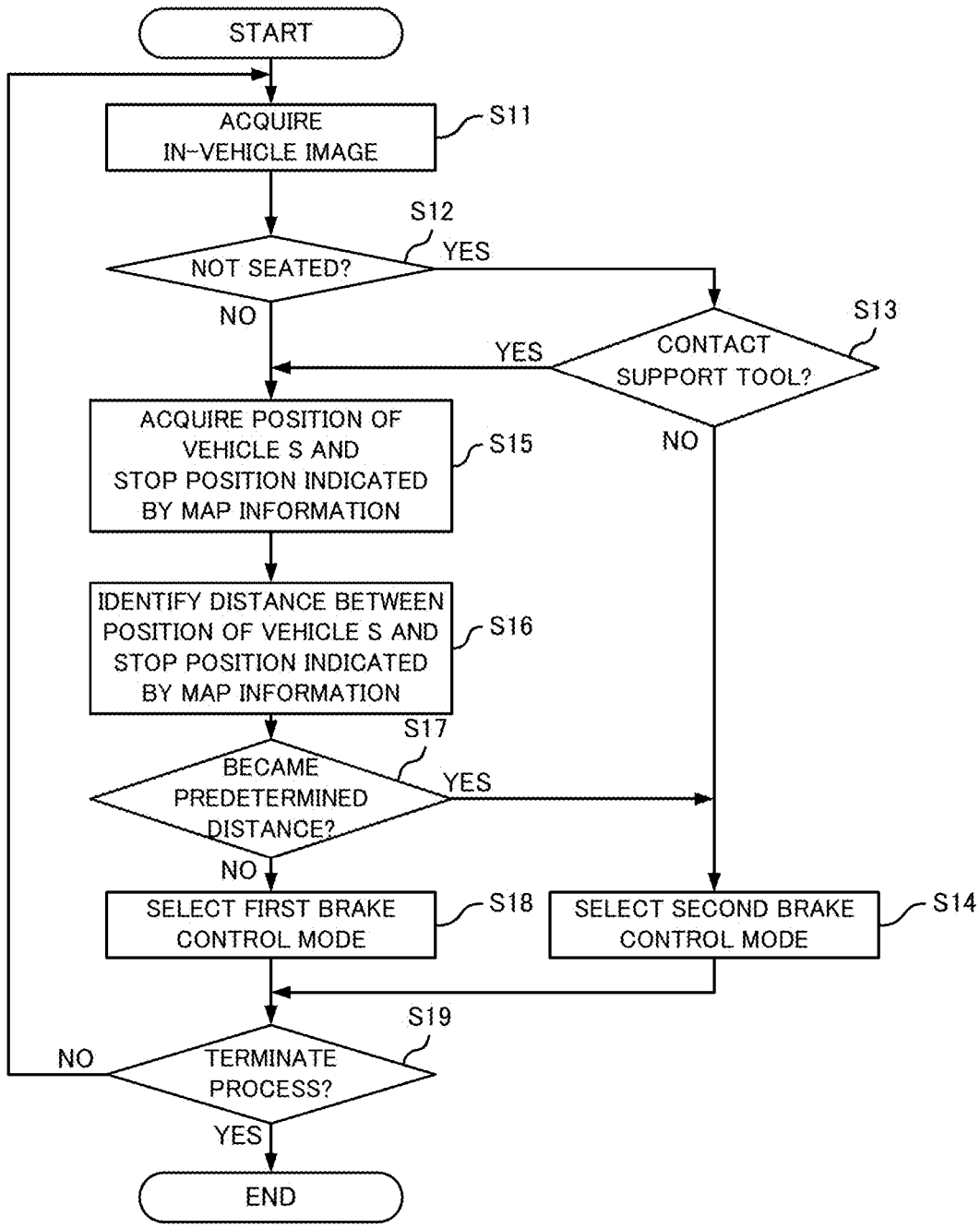
FIG. 4 shows an example of a process sequence in a brake control apparatus 10.

FIG. 4 shows an example of a process sequence in a brake control apparatus 10. The process sequence shown in FIG.

4 illustrates the operation whereby the determination part 122 determines whether or not the occupants are seated by using the in-vehicle image, and the selection part 123 selects either the first brake control mode or the second brake control mode on the basis of a determination result of the determination part 122. The brake control apparatus 10 repeats the process sequence shown in FIG. 4 at regular intervals.

The acquisition part 121 acquires the in-vehicle image from the in-vehicle camera 2 (S11). The determination part 122 extracts an image showing the occupants in the vehicle S from the in-vehicle image, and determines whether or not the occupants are seated in the seats (S12). If the determination part 122 determines that at least one occupant is not seated in a seat (YES in S12), the determination part 122 determines whether the hand of said at least one occupant is in contact with the support tool of the vehicle S (S13). If it is determined that the hand of the at least one occupant is not in contact with the support tool (NO in S13), the selection part 123 selects the second brake control mode (S14).

If the determination part 122 determines that the occupants are seated in the seats (NO in S12) or determines that the hand of each occupant who is not seated in a seat is in contact with a support tool (YES in S13), the selection part 123 acquires the position of the vehicle S and the stop position. The selection part 123, for example, acquires the position of the vehicle S indicated by the position information acquired by the acquisition part 121 and the stop position indicated by the map information stored in the storage 11 (S15), and identifies the distance between the position of the vehicle S and the stop position indicated by the map information (S16).

If the distance identified by the selection part 123 has become the predetermined distance (YES in S17), the selection part 123 selects the second brake control mode (S14). If the distance identified by the selection part 123 has not become the predetermined distance (NO in S17), the selection part 123 selects the first brake control mode (S18).

If no operation is performed to terminate the process (NO in S19), the brake control apparatus 10 repeats the process from step S11 to step S18. If an operation to terminate the process is performed (YES in S19), the brake control apparatus 10 terminates the process.

<Effect of Brake Control Apparatus 10>

As described above, the brake control apparatus 10 includes the determination part 122 that determines whether or not the occupants in the vehicle S are seated in the seats of the vehicle S, and the selection part 123 that selects the first brake control mode, which decelerates the vehicle S by using the main brake 6 and the auxiliary brake 7, if it is determined that the occupants are seated in the seats, and selects the second brake control mode, which decelerates the vehicle S by using the main brake 6 without the auxiliary brake 7, if it is determined that an occupant is not seated in a seat.

The brake control apparatus 10 is configured in such a way that it can decelerate the vehicle S smoothly without using the auxiliary brake 7 if an occupant in the vehicle S is not in a seat, thereby reducing the loss of the posture of the occupant who is not seated in a seat. As a result, the braking control suitable for the occupants can be performed. Furthermore, if the occupants in the vehicle S are seated in the seats, the auxiliary brake 7 is used to decelerate the vehicle S, thus reducing the wear and tear of the main brake 6.

The invention claimed is:

1. A brake control apparatus comprising:
a deceleration control part that decelerates a vehicle either in a first brake control mode using a main brake and an auxiliary brake that uses discrete deceleration values, or in a second brake control mode using the main brake without the auxiliary brake;
a determination part that determines whether or not occupants in the vehicle are seated in seats of the vehicle;
a selection part that selects the first brake control mode if the determination part determines that the occupants are seated in the seats, and selects the second brake control mode if the determination part determines that the occupant is not seated in the seat; and
an acquisition part that acquires an in-vehicle image obtained by capturing an image of an inside of the vehicle,
wherein the determination part determines whether or not a hand of the occupant who is not seated in the seat, which is extracted from the in-vehicle image, is in contact with a support tool of the vehicle, and
wherein the selection part selects the first brake control mode if the determination part determines that the hand of the occupant who is not seated in the seat is in contact with the support tool, and selects the second brake control mode if the determination part determines that the hand of the occupant is not in contact with the support tool.

2. The brake control apparatus according to claim 1, wherein
the acquisition part acquires the in-vehicle image generated by capturing an image of an area where the seat is not provided inside of the vehicle.

3. A brake control apparatus comprising:
a deceleration control part that decelerates a vehicle either in a first brake control mode using a main brake and an auxiliary brake that uses discrete deceleration values, or in a second brake control mode using the main brake without the auxiliary brake;
a determination part that determines whether or not occupants in the vehicle are seated in seats of the vehicle;
a selection part that selects the first brake control mode if the determination part determines that the occupants are seated in the seats, and selects the second brake control mode if the determination part determines that the occupant is not seated in the seat; and
an acquisition part that acquires an in-vehicle image generated by capturing an image of an area where the seat is not provided inside of the vehicle, wherein
the determination part determines that the occupant is not seated in the seat if at least one occupant is extracted from the area included in the in-vehicle image acquired by the acquisition part, and determines that the occupants are seated in the seats if the occupant is not extracted from the area.

4. A brake control apparatus comprising:
a deceleration control part that decelerates a vehicle either in a first brake control mode using a main brake and an auxiliary brake that uses discrete deceleration values, or in a second brake control mode using the main brake without the auxiliary brake;
a determination part that determines whether or not occupants in the vehicle are seated in seats of the vehicle;
a selection part that selects the first brake control mode if the determination part determines that the occupants are seated in the seats, and selects the second brake control mode if the determination part determines that the occupant is not seated in the seat; and an acquisition part that acquires a weight loaded on an area of a floor surface inside of the vehicle where the seat is not provided, wherein the determination part determines whether or not the occupants are seated in the seats on a basis of the weight.

5. A brake control apparatus comprising:

a deceleration control part that decelerates a vehicle either in a first brake control mode using a main brake and an auxiliary brake that uses discrete deceleration values, or in a second brake control mode using the main brake without the auxiliary brake;

a determination part that determines whether or not occupants in the vehicle are seated in seats of the vehicle;

a selection part that selects the first brake control mode if the determination part determines that the occupants are seated in the seats, and selects the second brake control mode if the determination part determines that the occupant is not seated in the seat;

a storage that stores map information including a route for the vehicle to travel; and an acquisition part that acquires position information indicating a position of the vehicle, wherein the selection part selects the second brake control mode if the determination part determines that the occupants are seated and if the vehicle arrived at a position that is a predetermined distance prior to a stop position in the route included in the map information.

6. The brake control apparatus according to claim 5, wherein the acquisition part acquires an outside-vehicle image obtained by capturing an image in front of the vehicle in a traveling direction, and the selection part selects the second brake control mode if the selection part detects that there is a person crossing a crosswalk included in the outside-vehicle image and if a distance between a position of the crosswalk indicated by the map information and the position of the vehicle traveling prior to the crosswalk became a predetermined distance.

7. A brake control apparatus comprising a deceleration control part that decelerates a vehicle either in a first brake control mode using a main brake and an auxiliary brake that uses discrete deceleration values, or in a second brake control mode using the main brake without the auxiliary brake;

a determination part that determines whether or not occupants in the vehicle are seated in seats of the vehicle; and a selection part that selects the first brake control mode if the determination part determines that the occupants are seated in the seats, and selects the second brake control mode if the determination part determines that the occupant is not seated in the seat, wherein the selection part identifies deceleration of the vehicle on a basis of a distance between a position of the vehicle and a position at which the vehicle stops and a speed of the vehicle, selects the second brake control mode if the deceleration is equal to or greater than a threshold value, and selects the first brake control mode if the deceleration is less than the threshold value.

* * * * *